INVENTOR
ROBERT KATZ
BY Jacobi & Davidson
ATTORNEYS

Jan. 13, 1970

R. KATZ 3,488,817

APPARATUS FOR PREMOULDING WALLS, PANELS AND
WALL SLABS, AND METHOD OF USE

Filed Aug. 24, 1966

INVENTOR
ROBERT KATZ
BY Jacobi & Davidson
ATTORNEYS

United States Patent Office 3,488,817
Patented Jan. 13, 1970

3,488,817
APPARATUS FOR PREMOULDING WALLS, PANELS AND WALL SLABS, AND METHOD OF USE
Robert Katz, Tivoli, Primrose Ave., Bishops Court Estate, Claremont, Cape Province, Republic of South Africa
Filed Aug. 24, 1966, Ser. No. 574,583
Claims priority, application Republic of South Africa, Aug. 30, 1965, 65/4,717
Int. Cl. E04b 2/84
U.S. Cl. 25—131
9 Claims

ABSTRACT OF THE DISCLOSURE

Molding apparatus comprising an elevated support structure, a plurality of mold sides suspended from the support structure in closely spaced series face-to-face relationship such that they are displaceable relative to one another to vary the spacing between them is disclosed. Each pair of mold sides has a pair of opposing end walls and means for maintaining the pair of mold sides in sealing relationship with the end walls and with the bottom wall to define a cavity for the molding of an article in the cavity in the form of a wall panel, floor or ceiling slab of desired dimensions from a settable cementitious mix.

---

Figure 1:
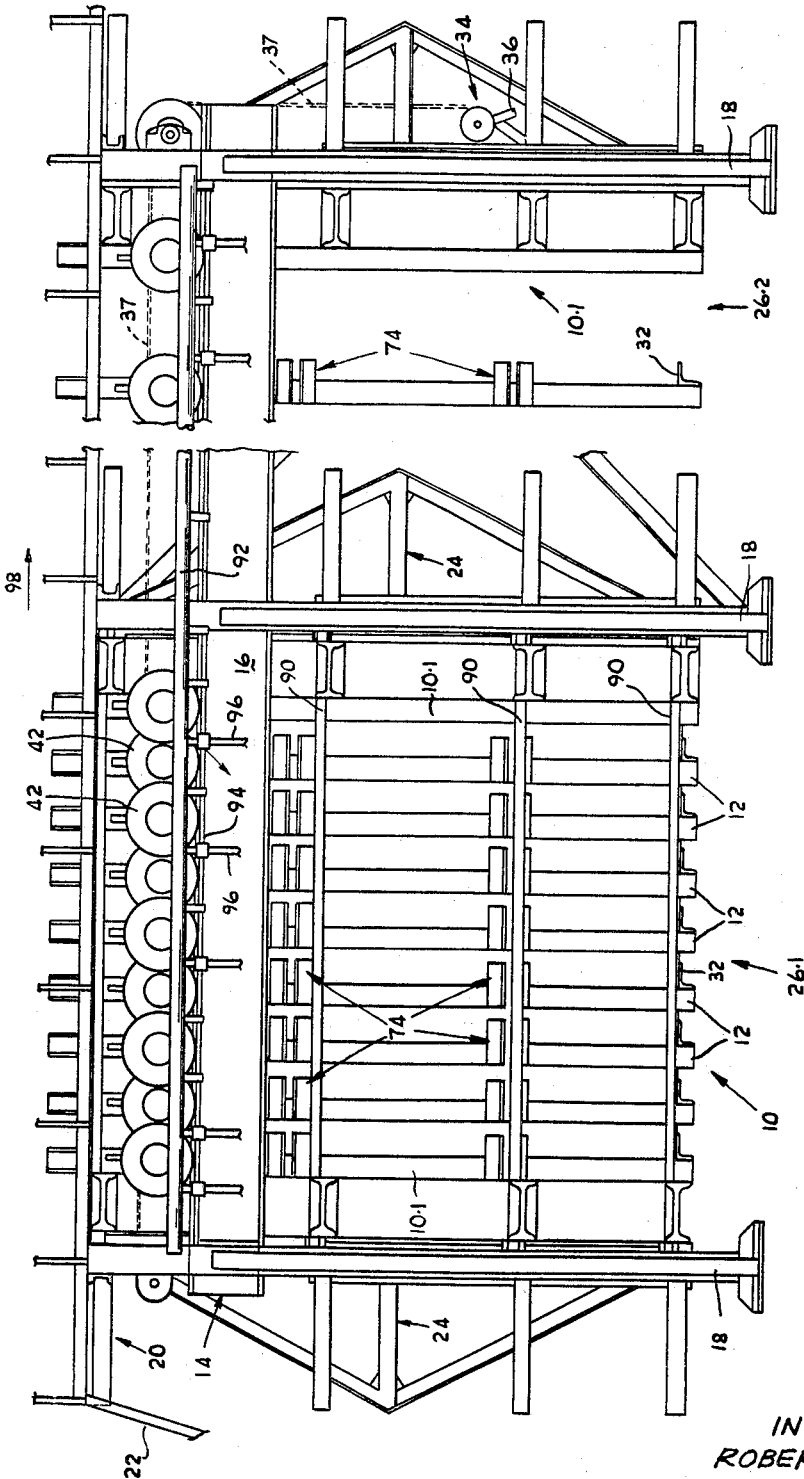

This invention relates to apparatus for the molding of wall, ceiling or floor slabs from cementitious material, particularly for the prefabrication of such slabs.

The use of wall, ceiling and floor slabs is a recent development in the construction of buildings. However, some contractors would prefer greater variation in dimensions of such panels or slabs in order to have greater flexibility in design and construction.

It is an object of this invention to provide apparatus capable of producing panels or slabs of varying dimensions.

According to the invention there is provided apparatus which includes a plurality of mold sides; support means for supporting them in closely spaced series face-to-face relationship; for each pair of adjacent mold sides a bottom wall and opposing end walls, at least one of which is locatable in position at different positions in the space between the mold sides relative to the other to vary the space between them, thereby to define an upwardly open cavity between the said walls and the said pair of mold sides for the molding to the cavity of an article in the form of a wall panel or floor or ceiling slab of desired dimensions from a settable cementitious mix; and means for maintaining the pair of mold sides in sealing relationship with the end walls and with the bottom wall to define the cavity.

The adjustability in position of an end wall on a mold side may be provided by one of a pair of mold sides having at least one bracket at one end for supporting an adjustable end-wall-support adjustably in position to permit variation in the spacing between the walls, thereby to provide the desired dimensions of the article. There may be provided another end-wall-support hingedly mounted on at least one bracket at the other end of the pair of mold sides, the hinge mounting being slotted to permit firstly endwise withdrawal of the end-wall from between the mold sides, and then to permit hinging of the end-wall about the hinge axis.

One of a pair of mold sides may be provided with a shoulder member at or near its lower edge for supporting the bottom wall at any desired elevation above it.

Attachment means may be provided for attachment and location in position of parts such as door frames, window frames, or piping, to the face of a mold side, to permit the parts to be molded integrally with and keyed to articles molded within the cavity. Means may also be provided for attachment of mold shapes to the face of a mold side to permit the molding of suitably shaped recesses or openings in an article.

The means for maintaining the mold sides in sealing relationship with the bottom walls and opposing end walls may comprise vertically spaced pairs of clamping bars across the ends of the mold sides, adapted to clamp the mold sides firmly and sealingly against the bottom walls and opposing end walls.

The mold sides may have means for circulating a heating fluid through them.

The mold sides may have means for suspending them from the support means in the said closely spaced series face-to-face relationship. The support means may extend longitudinally for supporting the mold sides in such a way that they are displaceable relatively to one another along the support means to widen the face-to-face spacing between a pair of mold sides to permit withdrawal from the cavity of an article molded between them.

The support means may include rails spaced at opposing ends of the mold sides, the mold sides having wheels adapted to roll along the rails to support the mold sides and to provide the displaceability for widening the face-to-face spacing between the mold sides. The rails may be provided in two pairs of parallel rail tracks, one track being slightly offset or being narrower in gauge than the other, the wheels of adjacent mold sides running on separate rails on the same side.

Two working bays may be provided, namely a molding bay and a stripping bay, a number of mold sides being provided, and at least some of which are displaceable from the molding bay into the stripping bay to permit separation of mold sides and the removal of molded articles. Alternatively, three working bays may be provided, namely a stripping bay, and two molding bays, one on either side of the stripping bay, each molding bay having a set of mold sides, at least some of the mold sides of the set in one of the molding bays being displaceable into the stripping bay for the removal of molded articles from between adjacent mold sides, while molding takes place in the set in the other molding bay.

There may be provided displacing means for displacing the mold sides and comprising a driven lay shaft carrying a pair of laterally spaced endless parallel chains passing through passage openings at the ends of the mold sides, and adapted to entrain a mold when entrainment members are engaged with the chains.

The invention will now be described by way of example with reference to the accompanying drawings.

Figure 2:
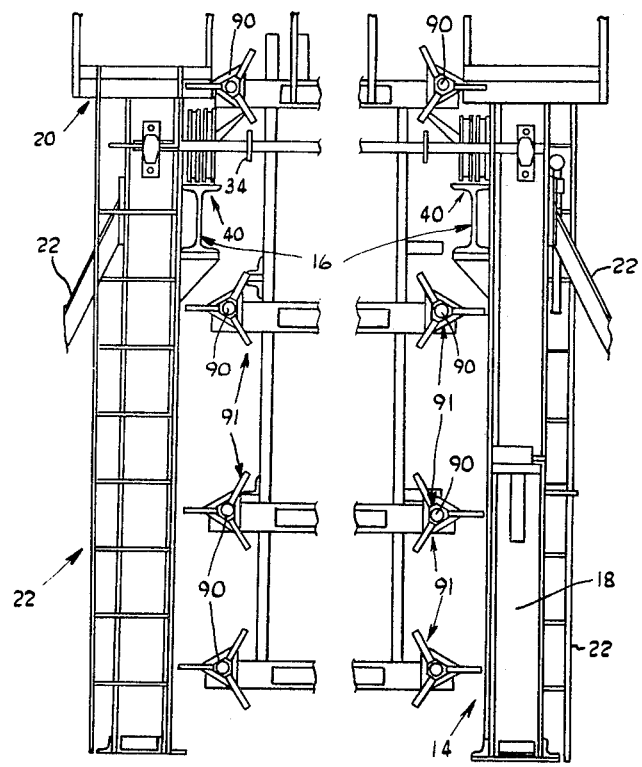
Figure 3:
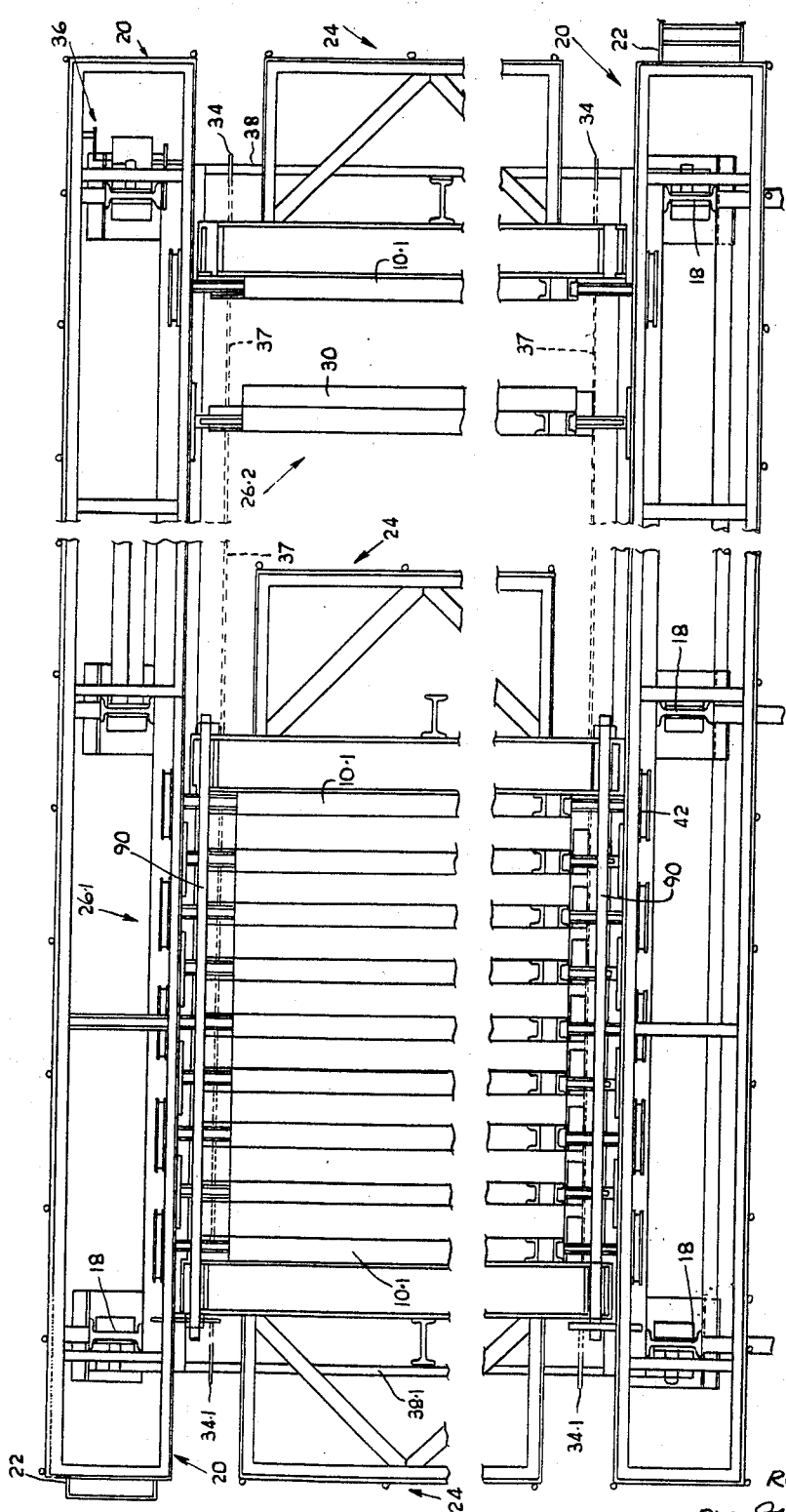
Figures 4, 5:
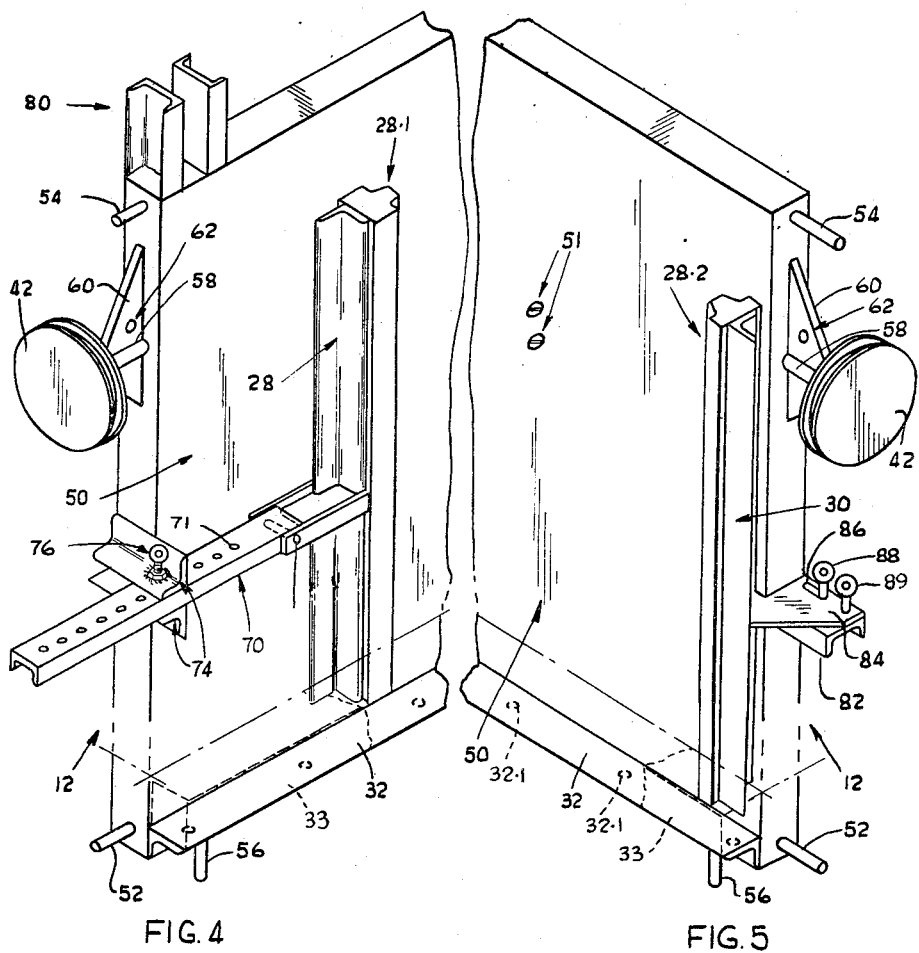
Figure 6:
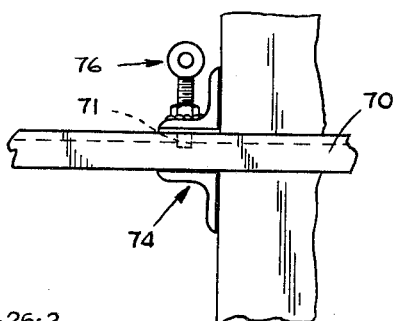
Figure 7:
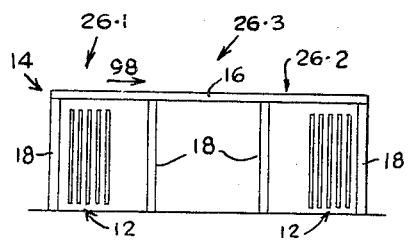

In the drawings:
FIGURE 1 shows a part side elevation of apparatus in accordance with the invention;
FIGURE 2 shows a part end elevation corresponding to FIGURE 1;
FIGURE 3 shows an expanded part plan corresponding to FIGURES 1 and 2;
FIGURE 4 shows an oblique part front view of one end of a mold side;
FIGURE 5 shows an oblique part front view of the other end of the mold side;
FIGURE 6 shows a detail part front elevation of a support bracket and an end wall support; and
FIGURE 7 shows diagrammatically in side elevation an arrangement of working and stripping bays.

Referring to the drawings, reference numeral 10 refers to apparatus which includes a plurality of mold sides 12 supported by support means generally indicated by reference numeral 14 for supporting the said mold sides in closely spaced series face-to-face relationship. The support means 14 includes laterally spaced beams 16, extending longitudinally, and supported upon laterally and longitudinally spaced columns 18. A cat-walk 20 is provided around the upper part of the apparatus, ladders 22 being provided, leading up to the cat-walk. The mold sides 10.1 at the ends, are stiffened by cross members and braces 24 to ensure that no bulging takes place when molding is taking place.

In FIGURES 1 and 3 there is shown a working bay 26.1 (a molding bay), the mold sides being shown in position for molding. The apparatus also has another molding bay 26.2, but the molds are shown to be separated, some of the mold sides being disposed in a stripping bay 26.3 which lies between the molding bays 26.1 and 26.2 as shown in FIGURE 7.

Each pair of mold sides is provided with a pair of end walls 28 and 30, and also with a shoulder 32, for supporting a bottom wall at any desired height, to provide the desired depth of cavity. (See FIGURES 4 and 5.)

The apparatus has displacing means which comprises sprockets 34, a crank handle 36, and mounted on a shaft 38. The sprockets 34 are axially spaced on the shaft 38, and engage with endless chains 37 spaced laterally relative to the apparatus. These chains engage with sprockets 34.1 at the other end of the apparatus, the sprockets 34.1 being mounted on a shaft 38.1. The manner in which the chains operate to displace the mold sides, will be explained more fully hereafter.

The support means further include rails 40 along the beams 16. It will be noted that a pair of closely spaced rails are provided on each side of the mold sides. This permits the wheels 42 of alternate mold sides only, to run on the same rail. Such an arrangement permits the use of big wheels 42 for a supporting the mold sides so as to lower stresses.

Referring now to FIGURES 4, 5 and 6 of the drawings, there is shown in FIGURE 4 the one end of a mold side, from obliquely in front. This mold side has a face 50 which is preferably smooth and planar. By way of explanation, FIGURES 4 and 5 are shown both from obliquely in front, but from opposite sides for clarity. It is to be understood, however, that the face 50 indicated in FIGURES 4 and 5, lies in one plane. The fact that FIGURES 4 and 5 are shown more or less at right angles, must not be understood to indicate that the mold side is of a shape other than flat.

The mold side is of hollow box-like fabricated steel construction having steam inlet connections 52, steam outlet connections 54, and condensate outlet connections 56. The mold side has a shoulder 32 along or at its lower edge. This shoulder stands proud of the face 50. By supporting the bottom wall 33 on this shoulder at any suitable height above it, any desired depth of cavity can be obtained, and hence any desired height of molded article. The mold side is provided with oppositely extending cantilever arms 58 having bearings for the wheels 42 which are adapted to run on rails 40. The cantilever arms 58 are supported by gusset plates 60 for stiffness. The gusset plates 60 are provided with holes 62 to permit the passage of the chains 37 engaging with the sprockets 34 and 34.1. If it is desired to displace the mold sides, then entrainment members in the form of pins or spikes may be dropped into engagement with the chains, whereupon they will project transversely beyond the edges of the holes 62, and thereby engage the gusset plates 60.

Referring now to the end wall 28, there is provided an end wall support 70 pivotally connected to the end wall 28, via pin 72. The support 70 engages with a support bracket 74 comprising a pair of vertically spaced arms, defining a passage-way between them. The passage-way is adapted to receive the support 70 slidably in a direction parallel to the face 50. Means are provided to lock the support bar relatively to the bracket 74. For relatively small runs of the same size of article, the support 70 will be locked frictionally in position on the bracket 74 by means of the screw 76. If, however, a large number of panels of the same size have to be made, then the support 70 may be locked in position relative to the bracket 74 by means of the screw engaging with a hole 71 provided specially in the support 70. In practice, at least two vertically spaced brackets 74 and supports 70 will be provided to permit of accurate location of the end wall 28.

When the height of the wall or the slab to be cast is not very great, that is when the bottom wall is rather high up, then it may not be possible to have the supports 70 engage with both brackets on the side of the mold side. For this purpose, an auxiliary bracket, generally indicated by reference numeral 80, is provided, projecting upwardly from the upper surface of the mold side. This auxiliary bracket is adapted to receive removable brackets (not shown) between them, adapted to engage with a support 70 higher up, above the mold sides.

Referring now to the other end of the mold side, it will be noted that the end wall 30 is hingedly mounted on the mold side, via a bracket 82, and a hinge mounting 84. The hinge mounting is provided with a slot 86 and pins 88 and 89. Only one hinge is shown, but it will be understood that at least two vertically spaced hinges will be provided to ensure adequate location and stiffness of the end wall 30.

The inner profiles 28.1 and 28.2 of the end walls 28 and 30 can be of any shape or configuration desired, depending upon requirements.

In operation, the mold sides 12 will be brought into the molding bay 26.1, the spacing between the end walls 28 and 30 being suitably adjusted and the height of the bottom wall above the shoulder 32 also being suitably adjusted. These adjustments will be made for each pair of mold sides which are to define a cavity within which a slab is to be cast. If there are any frames such as door frames, window frames, conduits, piping or the like, which are to be integrally cast, then they are located in position on the face 50 prior to the mating mold sides being moved up into closely spaced series face-to-face relationship. The door frames and the like are supported in position by suitably positioned blocks (not shown) held by screws engaging with threaded sockets provided in the face 50. When not in use, such sockets are plugged by plugs such as 51. Any indentations in the surface 50 are filled and smoothed over with a temporary filling material. This ensures that the surface finish of molded articles is not spoiled.

After all the adjustments have been made, then all the molds are brought into closely spaced series face-to-face relationship, the end molds 10.1 being at the ends. The mold sides are then clamped together by clamping bars 90 having nuts 91. (See FIGURES 1 and 2.) A cementitious mix is poured into the cavities, is vibrated, and hooks or eyes are set in position in the cavities for integral molding with the molded articles for later lifting of the molded articles. Thereupon the mix is allowed to set.

If desired, setting of the mix may be accelerated by passing a heating fluid through the mold sides. The heating fluid is conveniently steam, and this is fed into a header 92 having a series of lead-off connections 94 connected to flexible pipes 96, which are provided to permit the displacement of the mold sides in the direction of arrow 98, towards the stripping bay from the molding bay 26.1. It will be understood that for stripping the mold sides in molding bay 26.2, they will be moved towards the stripping bay in a direction opposite to that shown by arrow 98.

It is an advantage of this invention that while setting is taking place in one molding bay, the other one can be stripped and can be prepared for the next mix. The stripping bay is therefore used alternatively for receiving the mold sides from the two molding bays. Use of the stripping bay provides sufficient space between adjacent mold sides to permit workmen to enter the spaces between them to position the bottom walls and parts such as door frames, against the faces 50 of the mold sides 10.

It will be understood if it is desired to re-enforce the slabs or mold slabs to be cast, then it will be a relatively easy matter to provide re-enforcing material within the cavity, suitably located in position.

It is an advantage of this invention that it is versatile. It is versatile in this sense that it can produce panels or slabs of various sizes to suit various conditions.

I claim:

1. Apparatus which includes elevated support means extending longitudinally, a plurality of mold sides suspended from the support means in closely spaced series face-to-face relationship and such that they are displaceable relative to one another to vary the spacing between them; for each pair of adjacent mold sides a pair of opposing end walls and means for supporting a bottom wall; at least one of the opposing end walls being locatable in position at different positions in the space between the mold sides relative to the other to vary the distance between them, thereby to define an upwardly open cavity between the said walls and the said pair of mold sides for the molding in the cavity of an article in the form of a panel of desired dimensions from a settable cementitious mix; and means for maintaining the pair of mold sides in sealing relationship with the end walls and with a bottom wall supported on the bottom wall supporting means; the adjustability in position of the one end wall relative to a mold side being provided by one of a pair of mold sides having at least one bracket at one end for supporting adjustably in position an end wall support pivotally connected to the end wall to permit variation in the spacing between the end walls, thereby to provide the desired dimensions of the article to be molded.

2. Apparatus according to claim 1, in which there is provided another end-wall-support pivotally mounted on at least one bracket at the other end of the pair of mold sides, the hinge mounting being slotted to permit firstly endwise withdrawal of the end-wall from between the mold sides, and then to permit hinging of the end-wall about the hinge axis.

3. Apparatus as claimed in claim 1, in which the support means include rails spaced at opposing ends of the mold sides, the mold sides having wheels adapted to roll along the rails to support the mold sides and to provide the displaceability for widening the face-to-face spacing between the mold sides.

4. Apparatus as claimed in claim 3, in which the rails are provided in two pairs of parallel rail tracks, the wheels of adjacent mold sides running on separate rails on the same side.

5. Apparatus which includes elevated support means extending longitudinally; a plurality of mold sides suspended from the support means in closely spaced series face-to-face relationship and such that they are displaceable relative to one another to vary the spacing between them; the support means having two pairs of laterally spaced parallel rails, and the mold sides having wheels adapted to roll along the rails to support the mold sides and to provide the displaceability for widening the face-to-face spacing between the mold sides, the wheels of adjacent mold sides running on separate rails on the same side; each pair of adjacent mold sides having a bottom wall and a pair of opposing end walls, and means for maintaining the pair of mold sides in sealing relationship with the end walls and with the bottom wall to define a cavity between them for the molding in the cavity of an article in the form of a panel of desired dimensions from a settable cementitious mix.

6. Apparatus which includes elevated support means extending longitudinally, a plurality of mold sides suspended from the support means in closely spaced series face-to-face relationship, and such that they are displaceable relative to one another to vary the spacing between them; the support means having laterally spaced rails, and the mold sides having wheels adapted to run along the rails to support the mold sides and to provide the displaceability for widening the face-to-face spacing between the mold sides, each pair of adjacent mold sides having a bottom wall and a pair of opposing end walls, and means for maintaining the pair of mold sides in sealing relationship with the end walls and with the bottom wall to define a cavity between them for the molding in the cavity of an article in the form of a panel of desired dimensions from a settable cementitious mix; and in which the apparatus further includes two working bays, namely a molding bay and a stripping bay, at least some of the mold sides being displaceable from the molding bay into the stripping bay to permit separation of mold sides and the removal of molded articles.

7. Apparatus which includes elevated support means extending longitudinally, a plurality of mold sides suspended from the support means in closely spaced series face-to-face relationship, and such that they are displaceable relative to one another to vary the spacing between them; the support means having laterally spaced rails, and the mold sides having wheels adapted to run along the rails to support the mold sides and to provide the displaceability for widening the face-to-face spacing between the mold sides, each pair of adjacent mold sides having a bottom wall and a pair of opposing end walls, and means for maintaining the pair of mold sides in sealing relationship with the end walls and with the bottom wall to define a cavity between them for the molding in the cavity of an article in the form of a panel of desired dimensions from a settable cementitious mix; and in which the apparatus further includes three working bays, namely a stripping bay, and two molding bays, one on either side of the stripping bay, each molding bay having a set of mold sides, at least some of the mold sides of the set in one of the molding bays being displaceable into the stripping bay for the removal of molded articles from between adjacent mold sides, while molding takes place in the set in the other molding bay.

8. Apparatus which includes elevated support means extending longitudinally, a plurality of mold sides suspended from the support means in closely spaced series face-to-face relationship and such that they are displaceable relative to one another to vary the spacing between them; for each pair of adjacent mold sides a pair of opposing end walls and means for supporting a bottom wall; at least one of the opposing end walls being locatable in position at different positions in the space between the mold sides relative to the other to vary the distance between them, thereby to define an upwardly open cavity between the said walls and the said pair of mold sides for the molding in the cavity of an article in the form of a panel of desired dimensions from a settable cementitious mix; and means for maintaining the pair of mold sides in sealing relationship with the end walls and with a bottom wall supported on the bottom wall supporting means; and in which the apparatus further includes two working bays, namely a molding bay and a stripping bay, at least some of the mold sides being displaceable from the molding bay into the stripping bay to permit separation of mold sides and the removal of molded articles.

9. Apparatus which includes elevated support means extending longitudinally, a plurality of mold sides suspended from the support means in closely spaced series face-to-face relationship and such that they are displaceable relative to one another to vary the spacing between them; for each pair of adjacent mold sides a pair of opposing end walls and means for supporting a bottom wall; at least one of the opposing end walls being locatable in position at different positions in the space between the mold sides relative to the other to vary the distance between them, thereby to define an upwardly open cavity between the said walls and the said pair of mold sides for the molding in the cavity of an article in the form of a panel of desired dimensions from a settable cementitious mix; and means for maintaining the pair of mold sides in sealing relationship with the end walls and with a bottom wall supported on the bottom wall supporting means; and in which the apparatus further includes three working bays, namely a stripping bay, and two molding bays, one on either side of the stripping bay, each molding bay having a set of mold sides, at least some of the mold sides of the set in one of the molding bays being displaceable into the stripping bay for the removal of molded articles from between adjacent mold sides, while molding takes place in the set in the other molding bay.

References Cited

UNITED STATES PATENTS

| | | | |
|---|---|---|---|
| 399,139 | 3/1889 | Fenner | 249—81 |
| 529,309 | 11/1894 | Ramming | 249—158 |
| 2,787,820 | 4/1959 | Shields et al. | 249—39 X |
| 2,896,299 | 7/1959 | Hemb | 249—119 X |
| 3,192,594 | 7/1965 | Fougea. | |
| 3,360,231 | 12/1967 | Van Hezik | 249—129 |

FOREIGN PATENTS 24,440   8/1905   Austria.

J. SPENCER OVERHOLSER, Primary Examiner

DE WALDEN W. JONES, Assistant Examiner

U.S. Cl. X.R.

249—160